(12) United States Patent
Seagle et al.

(10) Patent No.: US 10,997,994 B1
(45) Date of Patent: May 4, 2021

(54) CURRENT-PERPENDICULAR-TO-PLANE (CPP) READ TRANSDUCER STRUCTURE HAVING FLUX GUIDE AND PINNED SOFT BIAS LAYER FOR STABILIZING SENSOR AND FLUX GUIDE

(71) Applicant: International Business Machines Corporation, Armonk, NY (US)

(72) Inventors: David Seagle, Morgan Hill, CA (US); Calvin Shyhjong Lo, Saratoga, CA (US); Robert Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/888,310

(22) Filed: May 29, 2020

(51) Int. Cl.
*G11B 5/39* (2006.01)
*G11B 5/008* (2006.01)

(52) U.S. Cl.
CPC .......... *G11B 5/3925* (2013.01); *G11B 5/3909* (2013.01); *G11B 5/3912* (2013.01); *G11B 5/3932* (2013.01); *G11B 5/00826* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 5,898,547 A * | 4/1999 | Fontana, Jr. et al. | G11B 5/3916 360/321 |
| 6,542,343 B1 * | 4/2003 | Gill | G11B 5/3925 360/324.2 |
| 8,472,148 B2 | 6/2013 | Brown et al. | |
| 8,760,823 B1 | 6/2014 | Chen et al. | |
| 8,780,506 B1 * | 7/2014 | Maat et al. | G11B 5/3932 360/319 |
| 9,786,302 B1 | 10/2017 | Brown et al. | |
| 9,830,936 B2 | 11/2017 | Li et al. | |
| 10,074,387 B1 * | 9/2018 | Xiao et al. | G11B 5/3912 |
| 10,354,681 B1 | 7/2019 | Chien et al. | |
| 2011/0019313 A1 * | 1/2011 | Brown et al. | G11B 5/3912 360/321 |
| 2011/0027618 A1 * | 2/2011 | Lee et al. | G11B 5/3909 428/811.2 |
| 2017/0011759 A1 * | 1/2017 | Ge et al. | G11B 5/3932 |
| 2017/0294197 A1 * | 10/2017 | Brown et al. | G11B 5/3916 |

OTHER PUBLICATIONS

U.S. Appl. No. 16/694,829, filed Nov. 25, 2019, Seagle et al.

* cited by examiner

*Primary Examiner* — Craig A. Renner
(74) *Attorney, Agent, or Firm* — Zilka-Kotab, P.C.

(57) ABSTRACT

An apparatus, in accordance with one aspect of the present invention, includes a module having a media facing surface. The module comprises the following components. A sensor is recessed from the media facing surface. A flux guide extends from the media facing surface toward the sensor. A soft bias layer is positioned on opposite sides of the sensor in a cross-track direction. A stabilization layer is located above the sensor, flux guide and soft bias layer for stabilizing the soft bias layer. A nonmagnetic exchange break layer is positioned above the sensor and the flux guide for magnetically decoupling the sensor and the flux guide from the stabilization layer.

25 Claims, 15 Drawing Sheets

CURRENT-PERPENDICULAR-TO-PLANE (CPP) READ TRANSDUCER STRUCTURE HAVING FLUX GUIDE AND PINNED SOFT BIAS LAYER FOR STABILIZING SENSOR AND FLUX GUIDE

BACKGROUND

The present invention relates to data storage systems, and more particularly, this invention relates to magnetic heads, e.g., magnetic tape heads, which include current-perpendicular-to-plane (CPP) reader transducers having flux guide and pinned soft bias layer for stabilizing the sensor and flux guide.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

Tunneling magnetoresistive (TMR) readers are susceptible to scratching caused by contact with asperities fixed on moving magnetic medium surfaces. Friction between asperities on the tape and the ductile metallic films in the sensor gives rise to deformation forces in the direction of tape motion. As a result, an electrical short is often created by the scratching and/or smearing of conductive material across the layers, which has a net effect of creating bridges of conductive material across the sensor. Particularly, particles protruding from the medium tend to plow through ductile magnetic material, e.g., from one or both shields, smearing the metal across the insulating material of the sensor, and thereby creating an electrical short that reduces the effective resistance of the sensor and diminishes the sensitivity of the sensor as a whole. Deep scratches may result in electrical shorting due to abrasive lapping particles that scratch or smear conductive material across the insulating materials separating the conductive leads, e.g., opposing shields, which allow sense (bias) current to flow through the sensor and magnetic head as a whole. Such shorting tends to result in a loss of amplitude and may result in inability to read the data track.

SUMMARY

An apparatus, in accordance with one aspect of the present invention, includes a module having a media facing surface. The module comprises the following components. A sensor is recessed from the media facing surface. A flux guide extends from the media facing surface toward the sensor. A soft bias layer is positioned on opposite sides of the sensor in a cross-track direction. A stabilization layer is located above the sensor, flux guide and soft bias layer for stabilizing the soft bias layer. A nonmagnetic exchange break layer is positioned above the sensor and the flux guide for magnetically decoupling the sensor and the flux guide from the stabilization layer.

The aforementioned structure reduces the probability of, and in most cases prevents, shorting in the most common areas where shorting has been observed in CPP reader transducers, including the relatively larger areas on opposite sides of the sensor between the shields.

The resilience is provided in part by recessing the sensor from the media facing surface, and employing the flux guide to transfer flux to the sensor. The approaches herein are applicable to data read transducers as well as servo read transducers.

In one approach, a portion of the flux guide is positioned behind the sensor relative to the media facing surface. While this portion is optional, its presence has been found to increase amplitude by increasing the flux to the free layer of the sensor.

In a preferred approach, the exchange break layer includes two separately-formed sub-layers, a first of the sub-layers being positioned only above the sensor and a second of the sub-layers being positioned only above the flux guide. Such configuration may provide a processing advantage, in that each sub-layer of the exchange break layer can be formed while defining the respective underlying structure.

In one approach, the stabilization layer has a reluctance that is higher than a reluctance of a free layer of the sensor. This reduces diversion of flux from the flux guide.

One approach includes a stitching layer between the stabilization layer and the soft bias layer. A material that stitches better to the stabilization layer may be used to enhance the bias applied to the soft bias layer.

Another approach includes a synthetic pinned layer structure between the stabilization layer and the soft bias layer. This structure is very robust and resistant to magnetic orientation changes due to events such as physical impacts.

The use of soft bias technology in tape heads provide side shielding of adjacent tracks, larger available bias field due to a higher remanence provided by soft bias technology, and an ability to provide more uniform bias across a large population or a large number of tape heads in a tape drive.

Soft bias technology, as currently designed for hard disk drive (HDD) heads, will not function in tape heads because the stabilization magnetics would shunt a significant amount of the transition flux away from the flux guide and free layer in the tape head, leaving insufficient signal or transition flux for the tape head to accurately read recorded data.

The approaches disclosed herein provide an effective way to apply soft bias technology to tape head design that provides reliable data retrieval from tape with adequate stabilization magnetics to identify required magnetic flux transitions thereby greatly improving tape head functionality.

An apparatus, in accordance with another aspect of the present invention, includes a module having a media facing surface. The module includes the following components. A first shield, and a sensor above the first shield and recessed from the media facing surface. A flux guide extends from the media facing surface toward the sensor. A soft bias layer is positioned on opposite sides of the sensor in a cross-track direction. A stabilization layer is positioned above the sensor, flux guide and soft bias layer for stabilizing the soft bias layer. A nonmagnetic exchange break layer is located above the sensor and the flux guide for magnetically decoupling the sensor and the flux guide from the stabilization layer. A nonmagnetic gap layer is positioned above the stabilization layer. A second shield is positioned above the gap layer.

The aforementioned structure reduces the probability of, and in most cases prevents, shorting in the most common areas where shorting has been observed in CPP reader transducers, including the relatively larger areas on opposite sides of the sensor between the shields.

The resilience is provided in part by recessing the sensor from the media facing surface, and employing the flux guide to transfer flux to the sensor. The approaches herein are applicable to data read transducers as well as servo read transducers.

In one approach, a portion of the flux guide is positioned behind the sensor relative to the media facing surface. While this portion is optional, its presence has been found to increase amplitude by increasing the flux to the free layer of the sensor.

In a preferred approach, the exchange break layer includes two separately-formed sub-layers, a first of the sub-layers being positioned only above the sensor and a second of the sub-layers being positioned only above the flux guide. Such configuration may provide a processing advantage, in that each sub-layer of the exchange break layer can be formed while defining the respective underlying structure.

One approach includes a stitching layer between the stabilization layer and the soft bias layer. A material that stitches better to the stabilization layer may be used to enhance the bias applied to the soft bias layer.

Another approach includes a synthetic pinned layer structure between the stabilization layer and the soft bias layer. This structure is very robust and resistant to magnetic orientation changes due to events such as physical impacts.

The use of soft bias technology in tape heads provide side shielding of adjacent tracks, larger available bias field due to a higher remanence provided by soft bias technology, and an ability to provide more uniform bias across a large population or a large number of tape heads in a tape drive.

Soft bias technology, as currently designed for hard disk drive (HDD) heads, will not function in tape heads because the stabilization magnetics would shunt a significant amount of the transition flux away from the flux guide and free layer in the tape head, leaving insufficient signal or transition flux for the tape head to accurately read recorded data.

The approaches disclosed herein provide an effective way to apply soft bias technology to tape head design that provides reliable data retrieval from tape with adequate stabilization magnetics to identify required magnetic flux transitions thereby greatly improving tape head functionality.

Any of the foregoing aspects may be implemented in a magnetic data storage system such as a tape drive system, which may include a magnetic head, a drive mechanism for passing a magnetic medium (e.g., recording tape) over the magnetic head, and a controller electrically coupled to the magnetic head.

A method for forming an apparatus, in accordance with one aspect of the present invention, includes forming a sensor at a position recessed from an expected location of a media facing surface. A flux guide that extending toward the sensor from the expected location of the media facing surface is formed. A nonmagnetic exchange break layer is formed above the sensor and the flux guide. A soft bias layer is formed on opposite sides of the sensor in a cross-track direction. A stabilization layer is formed above the exchange break layer and soft bias layer for stabilizing the soft bias layer, the exchange break layer magnetically decoupling the sensor and the flux guide from the stabilization layer.

Other aspects of the present invention will become apparent from the following detailed description, which, when taken in conjunction with the drawings, illustrate by way of example the principles of the invention.

DETAILED DESCRIPTION

Figure 1A:
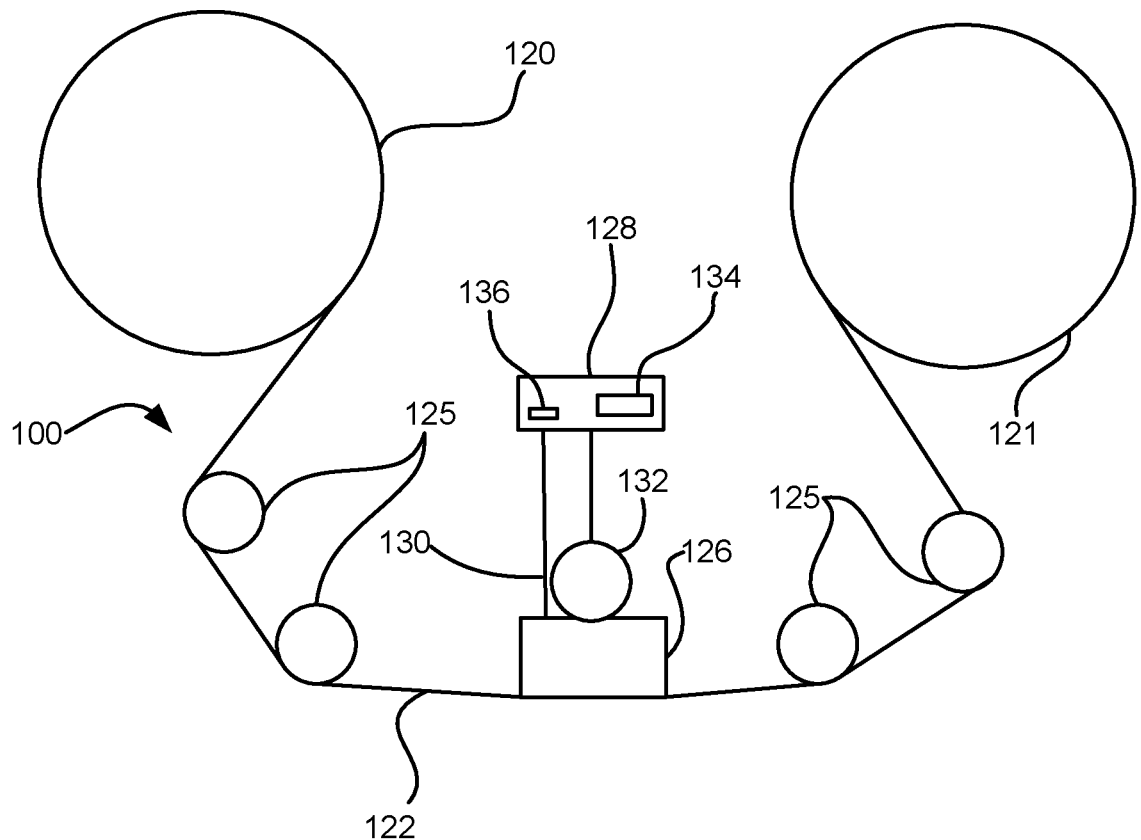
FIG. 1A is a schematic diagram of a simplified tape drive system according to one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of magnetic storage systems, as well as operation and/or component parts thereof.

In one general aspect of the present invention, an apparatus includes a module having a media facing surface. The module comprises the following components. A sensor is recessed from the media facing surface. A flux guide extends from the media facing surface toward the sensor. A soft bias layer is positioned on opposite sides of the sensor in a cross-track direction. A stabilization layer is located above the sensor, flux guide and soft bias layer for stabilizing the soft bias layer. A nonmagnetic exchange break layer is positioned above the sensor and the flux guide for magnetically decoupling the sensor and the flux guide from the stabilization layer.

In another general aspect of the present invention, an apparatus includes a module having a media facing surface. The module includes the following components. A first shield, and a sensor above the first shield and recessed from the media facing surface. A flux guide extends from the media facing surface toward the sensor. A soft bias layer is positioned on opposite sides of the sensor in a cross-track direction. A stabilization layer is positioned above the sensor, flux guide and soft bias layer for stabilizing the soft bias layer. A nonmagnetic exchange break layer is located above the sensor and the flux guide for magnetically decoupling the sensor and the flux guide from the stabilization layer. A nonmagnetic gap layer is positioned above the stabilization layer. A second shield is positioned above the gap layer.

In yet another general aspect of the present invention, a method includes forming a sensor at a position recessed from an expected location of a media facing surface. A flux guide that extending toward the sensor from the expected location of the media facing surface is formed. A nonmagnetic exchange break layer is formed above the sensor and the flux guide. A soft bias layer is formed on opposite sides of the sensor in a cross-track direction. A stabilization layer is formed above the exchange break layer and soft bias layer for stabilizing the soft bias layer, the exchange break layer magnetically decoupling the sensor and the flux guide from the stabilization layer.

FIG. 1A illustrates a simplified tape drive 100 of a tape-based data storage system, which may be employed in the context of the present invention. While one specific implementation of a tape drive is shown in FIG. 1A, it should be noted that the aspects described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various aspects. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
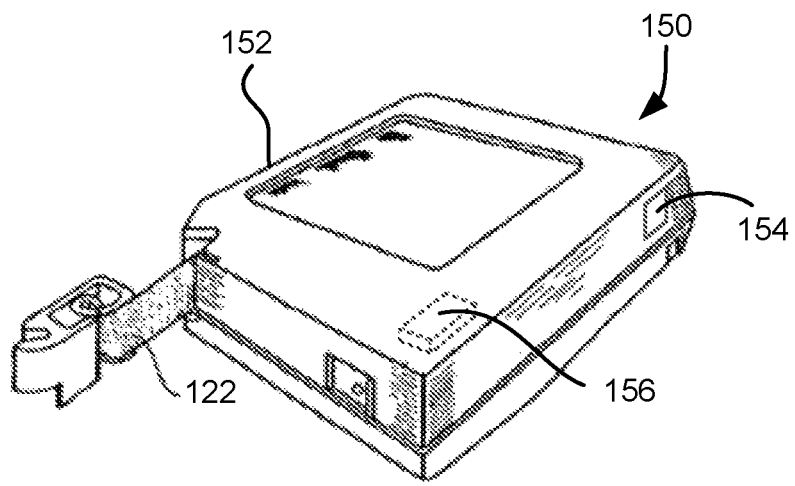
FIG. 1B is a schematic diagram of a tape cartridge according to one approach.

FIG. 1B illustrates an exemplary tape cartridge 150 according to one aspect. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
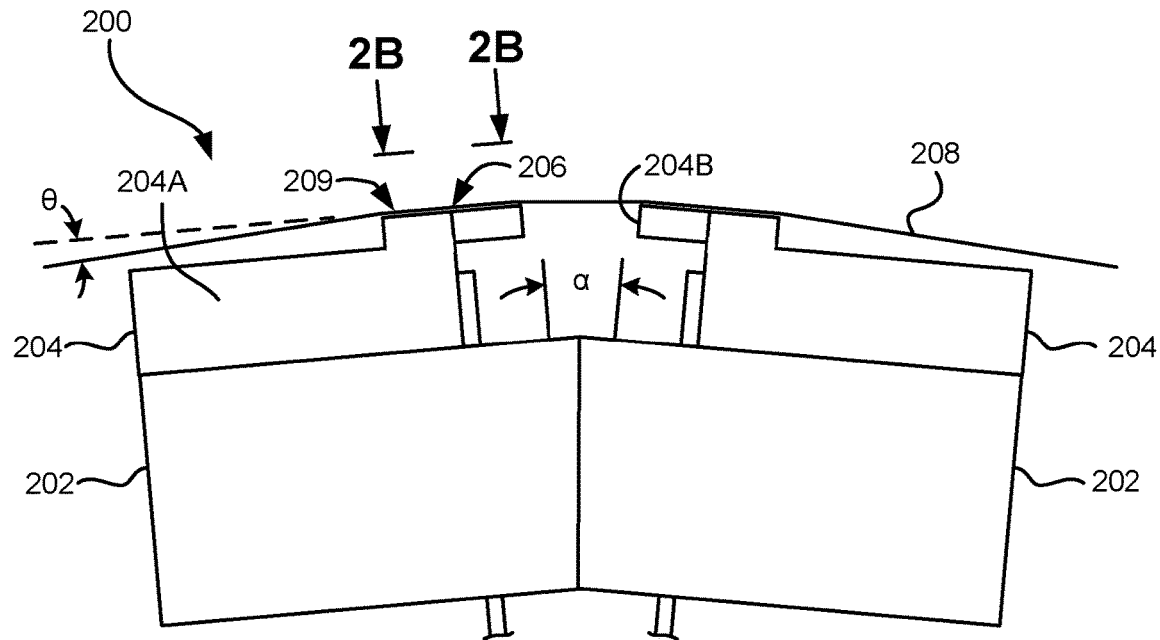
FIG. 2A illustrates a side view of a flat-lapped, bi-directional, two-module magnetic tape head according to one approach.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
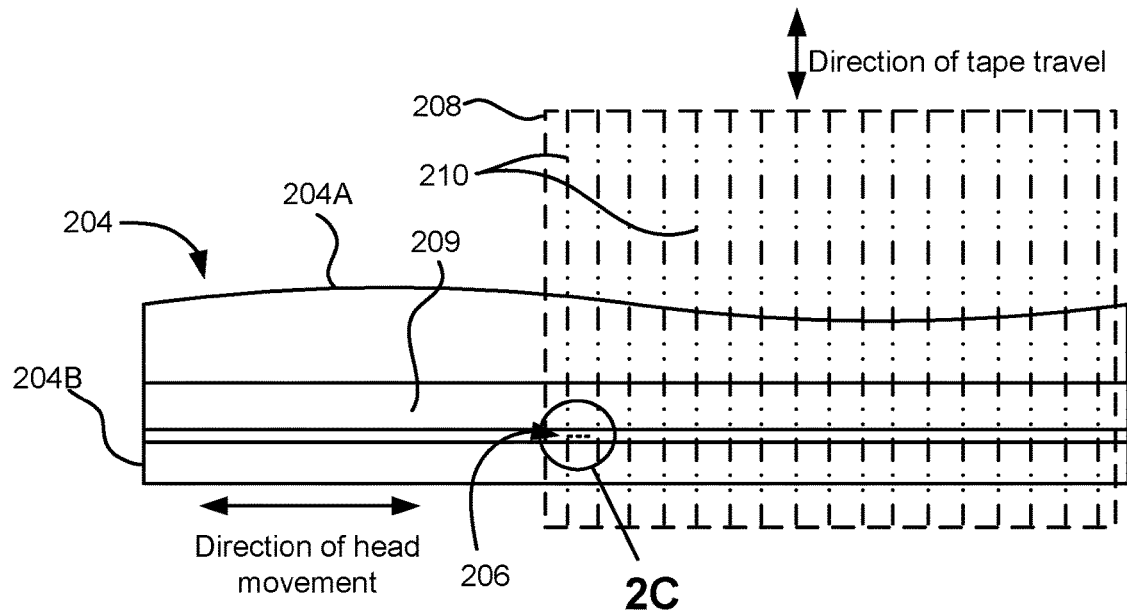
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
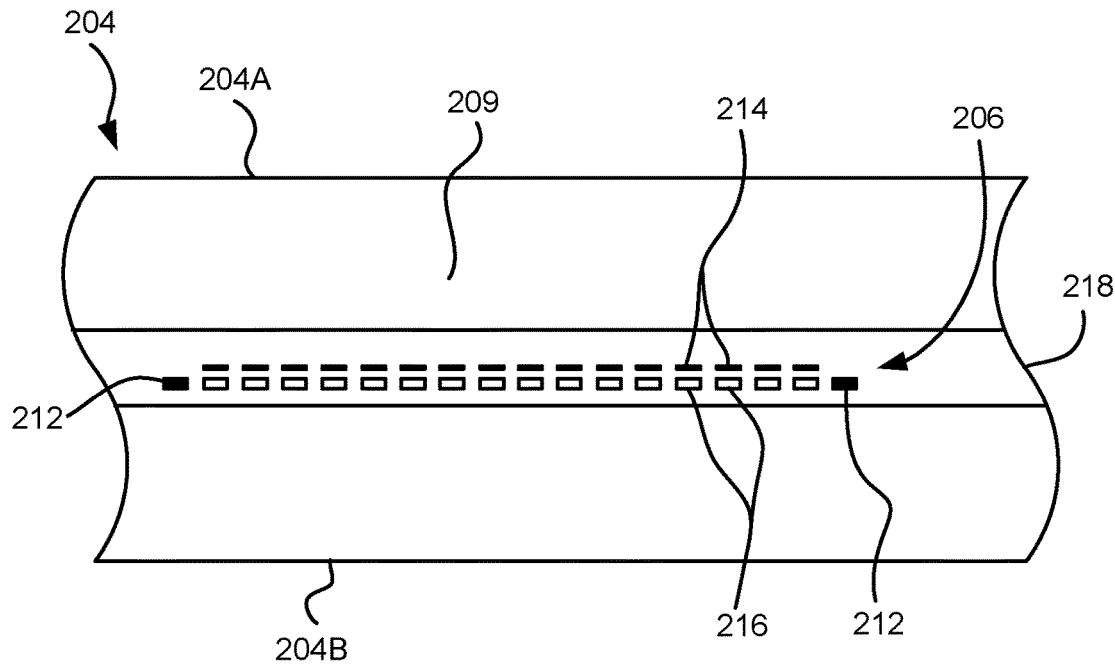
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative approaches include 8, 16, 32, 40, and 64 active read transducers and/or write transducers 206 per array, and alternatively interleaved designs having odd numbers of read transducers or write transducers such as 17, 25, 33, etc. An illustrative approach includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
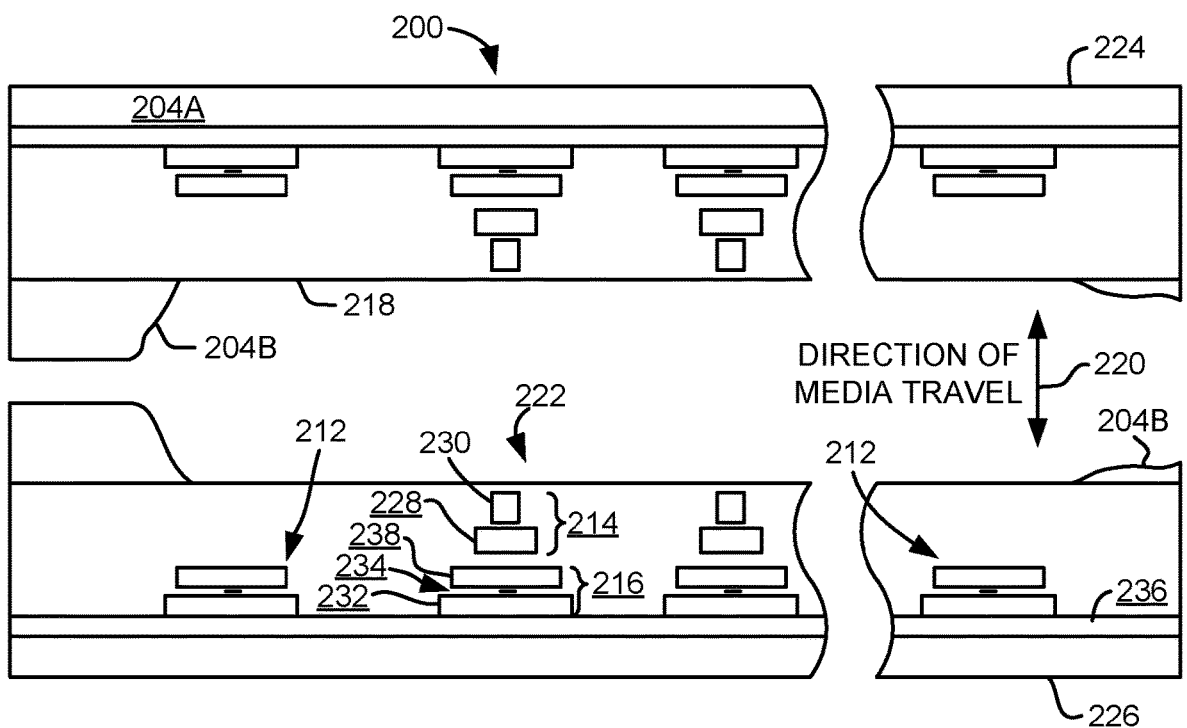
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
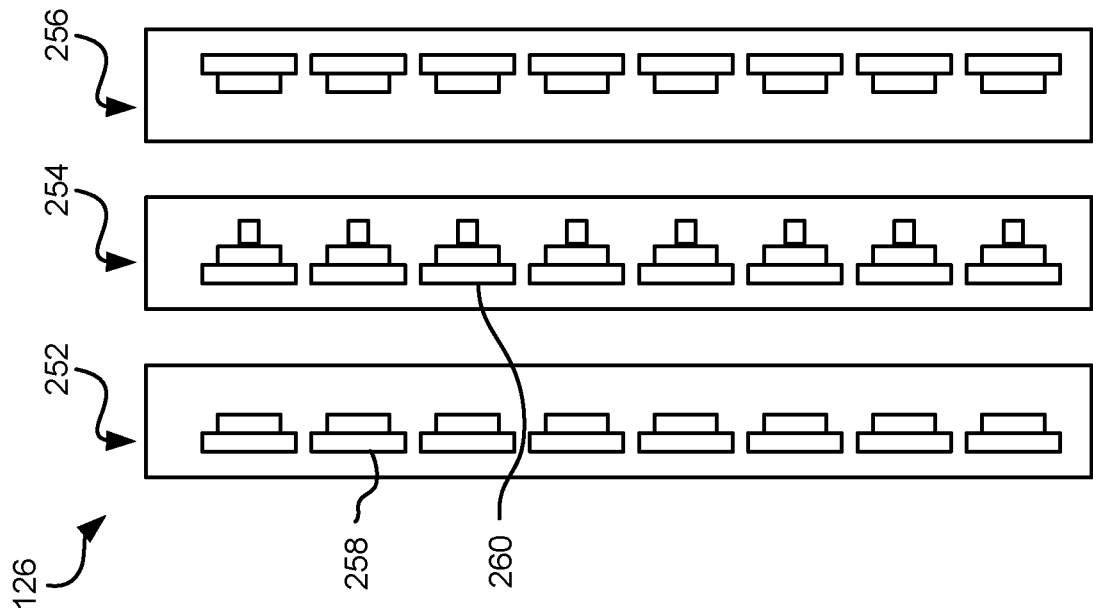
FIG. 4 is a partial tape bearing surface view of a magnetic head having a read-write-read configuration.
Figure 3:
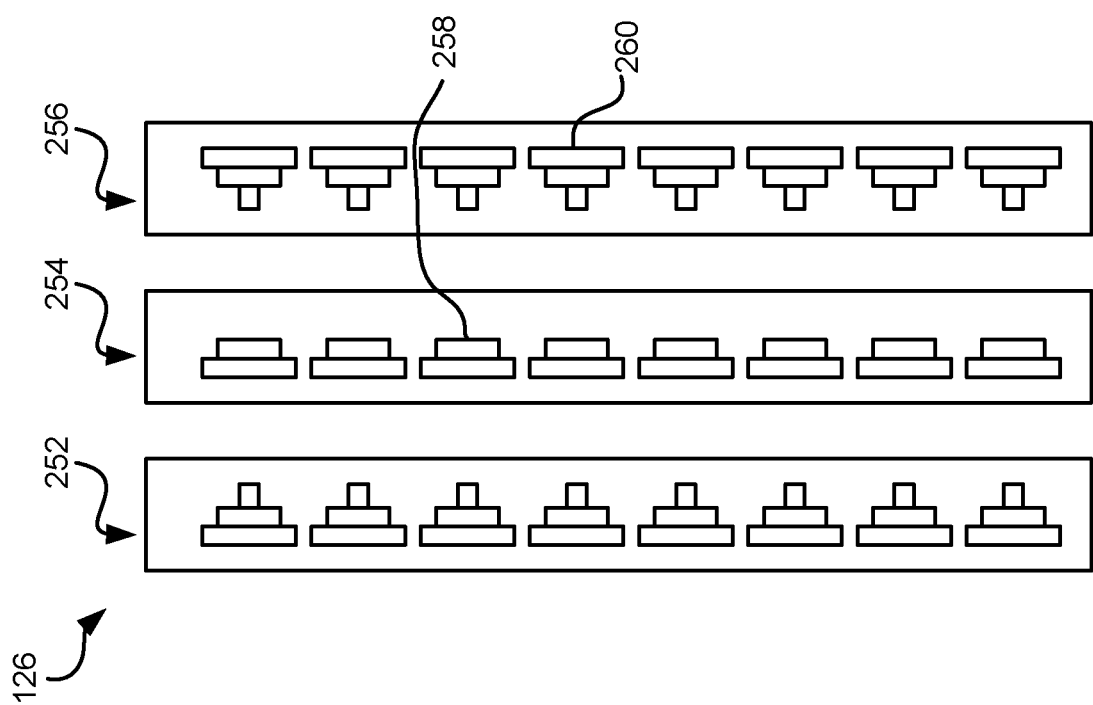
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify aspects of the present invention. One skilled in the art apprised with the teachings herein will appreciate how permutations of the present invention would apply to configurations other than a W-R-W configuration.

Figure 5:
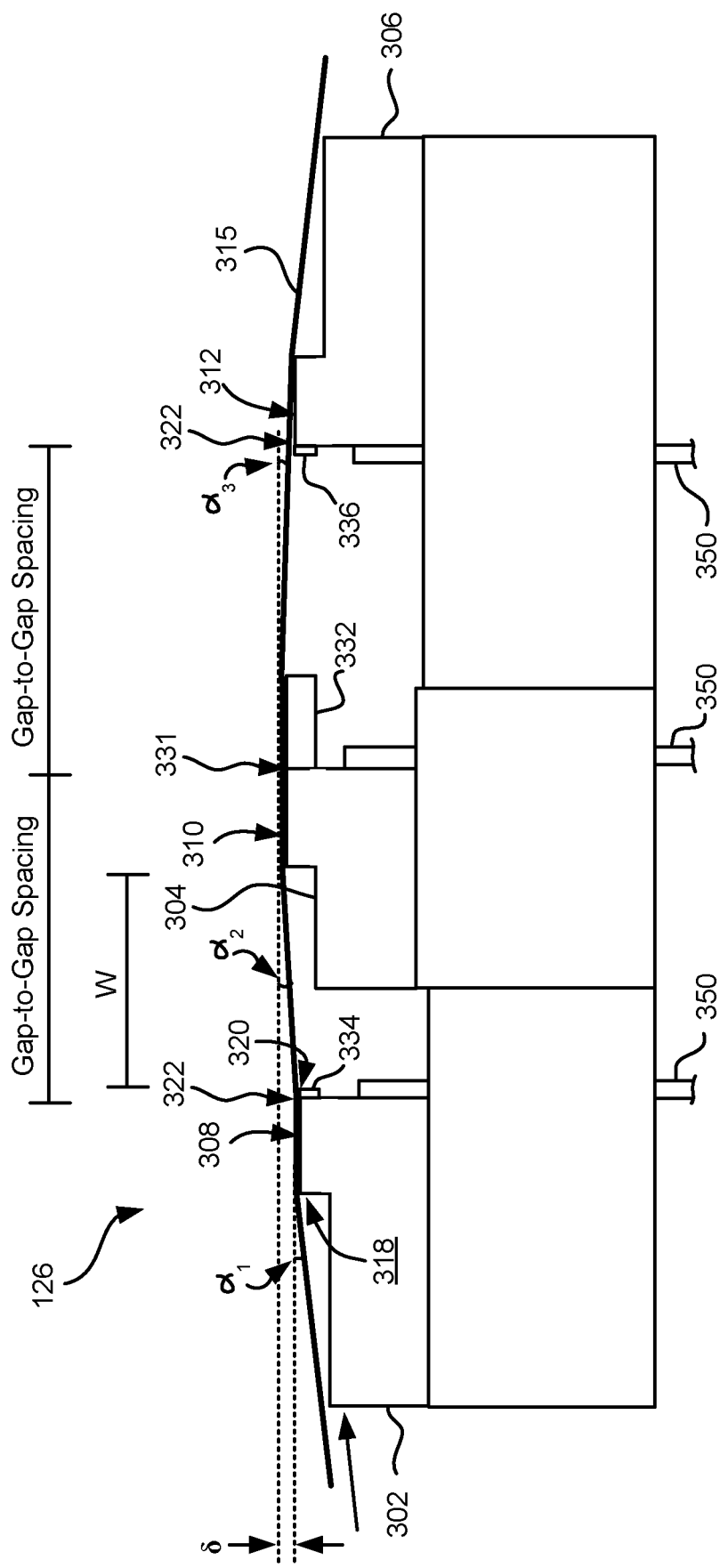
FIG. 5 is a side view of a magnetic tape head with three modules according to one approach where the modules all generally lie along about parallel planes.

FIG. 5 illustrates a magnetic head 126 according to one approach of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
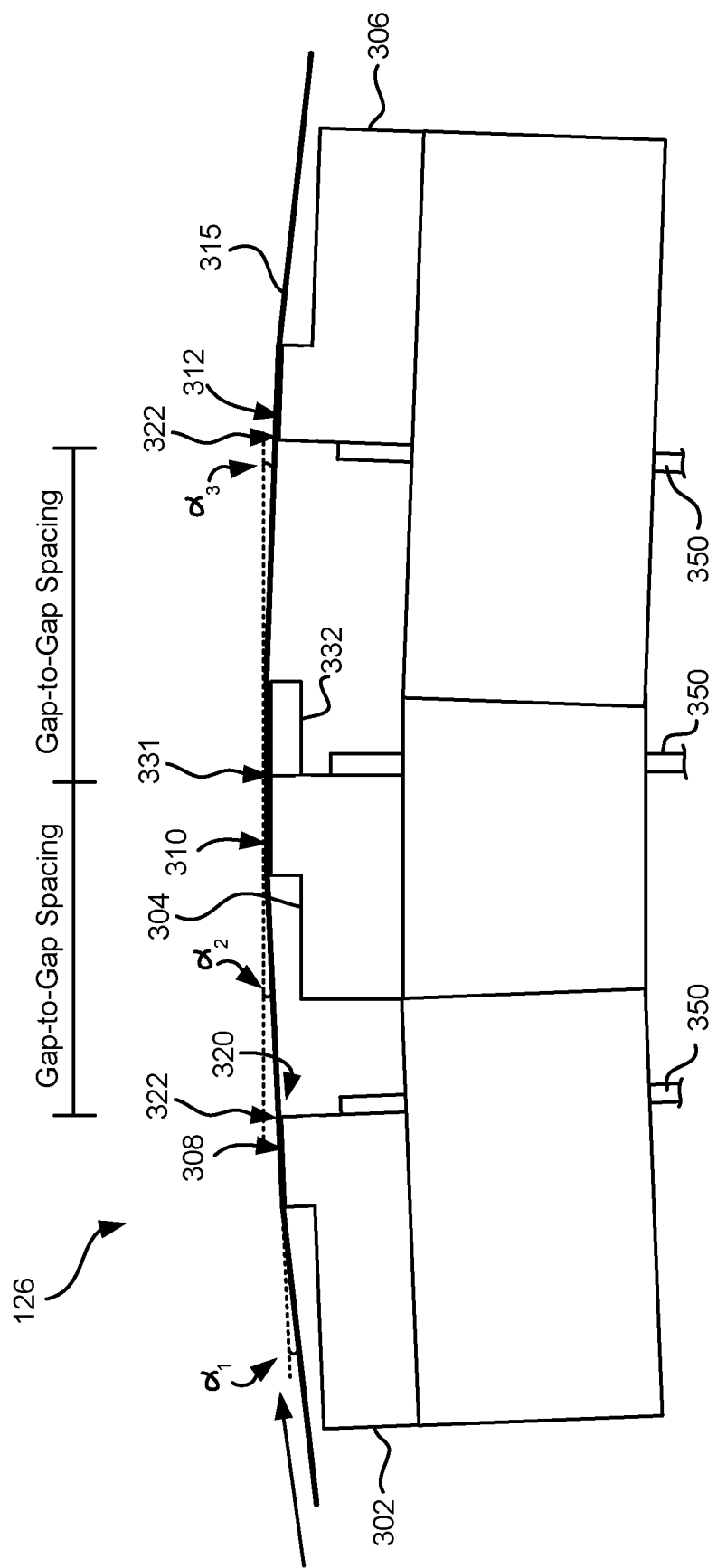
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some aspects is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
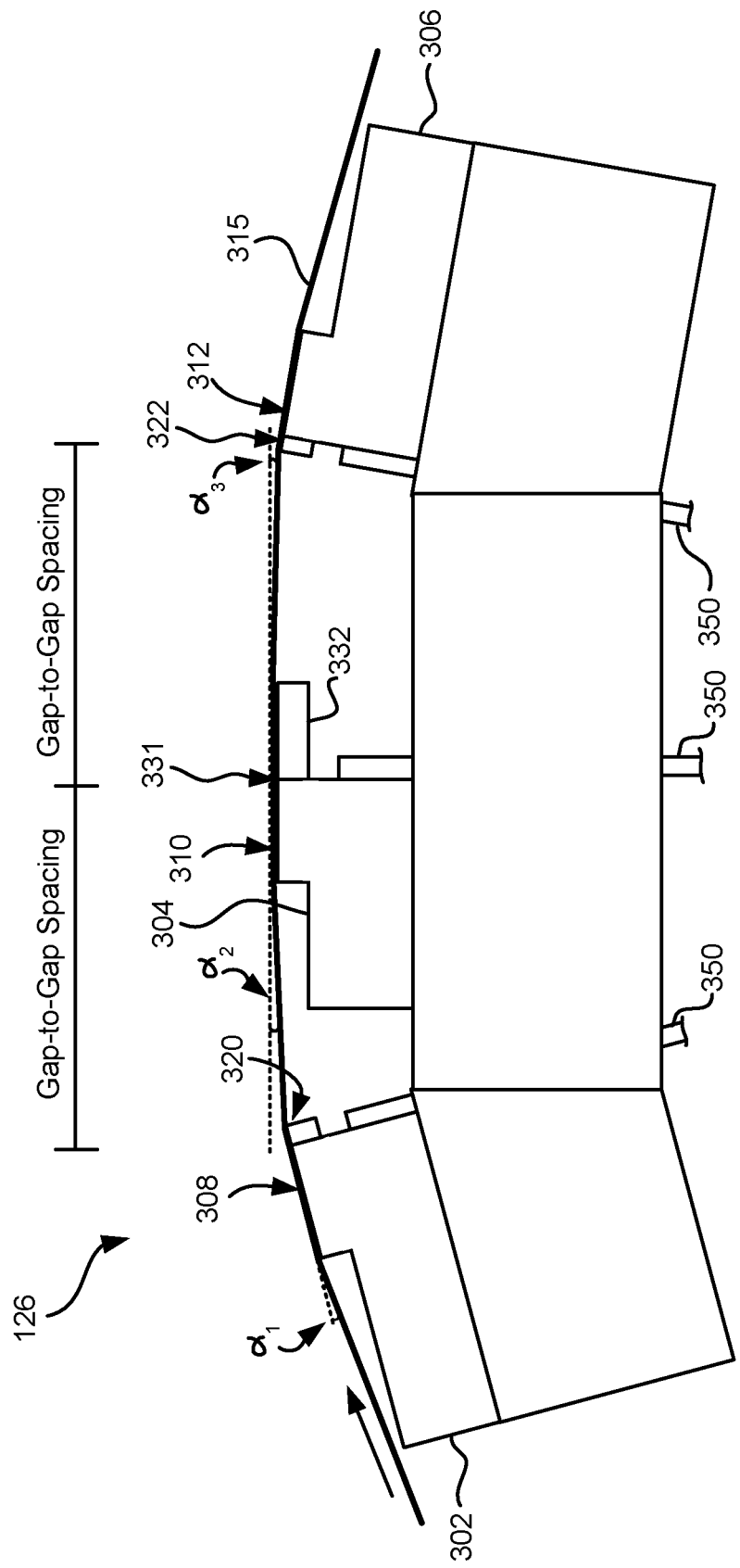
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
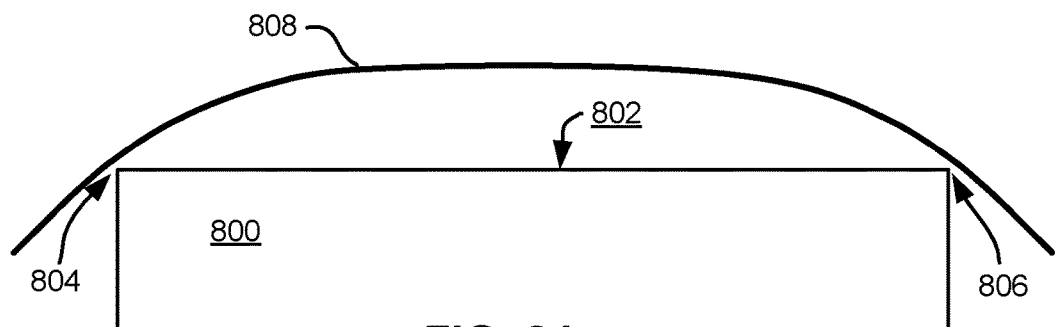
FIGS. 8A-8C are schematics depicting the principles of tape tenting.
Figure 8B:
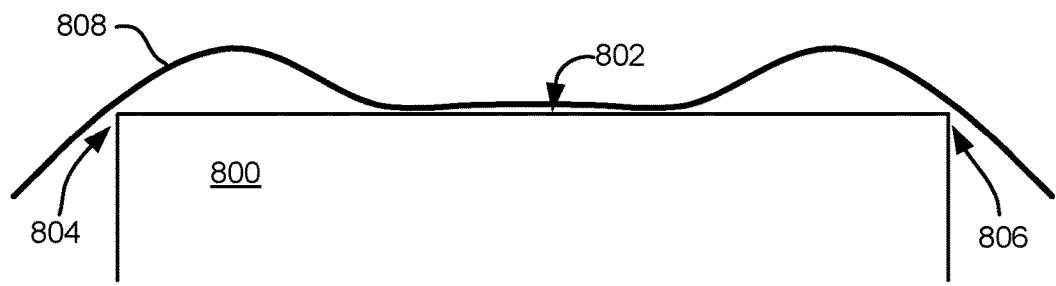
Figure 8C:
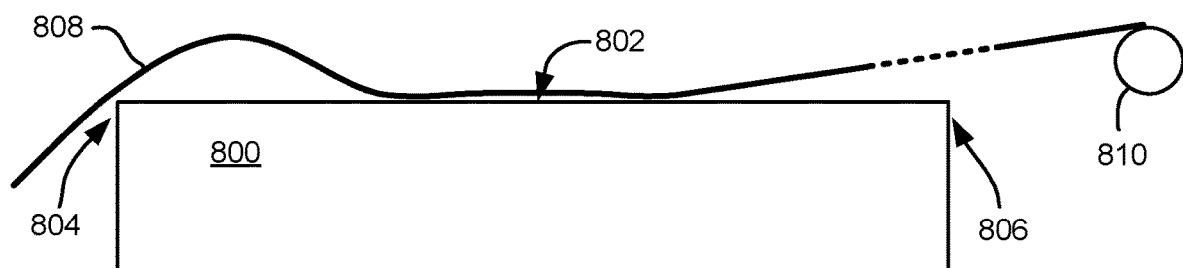

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various aspects herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
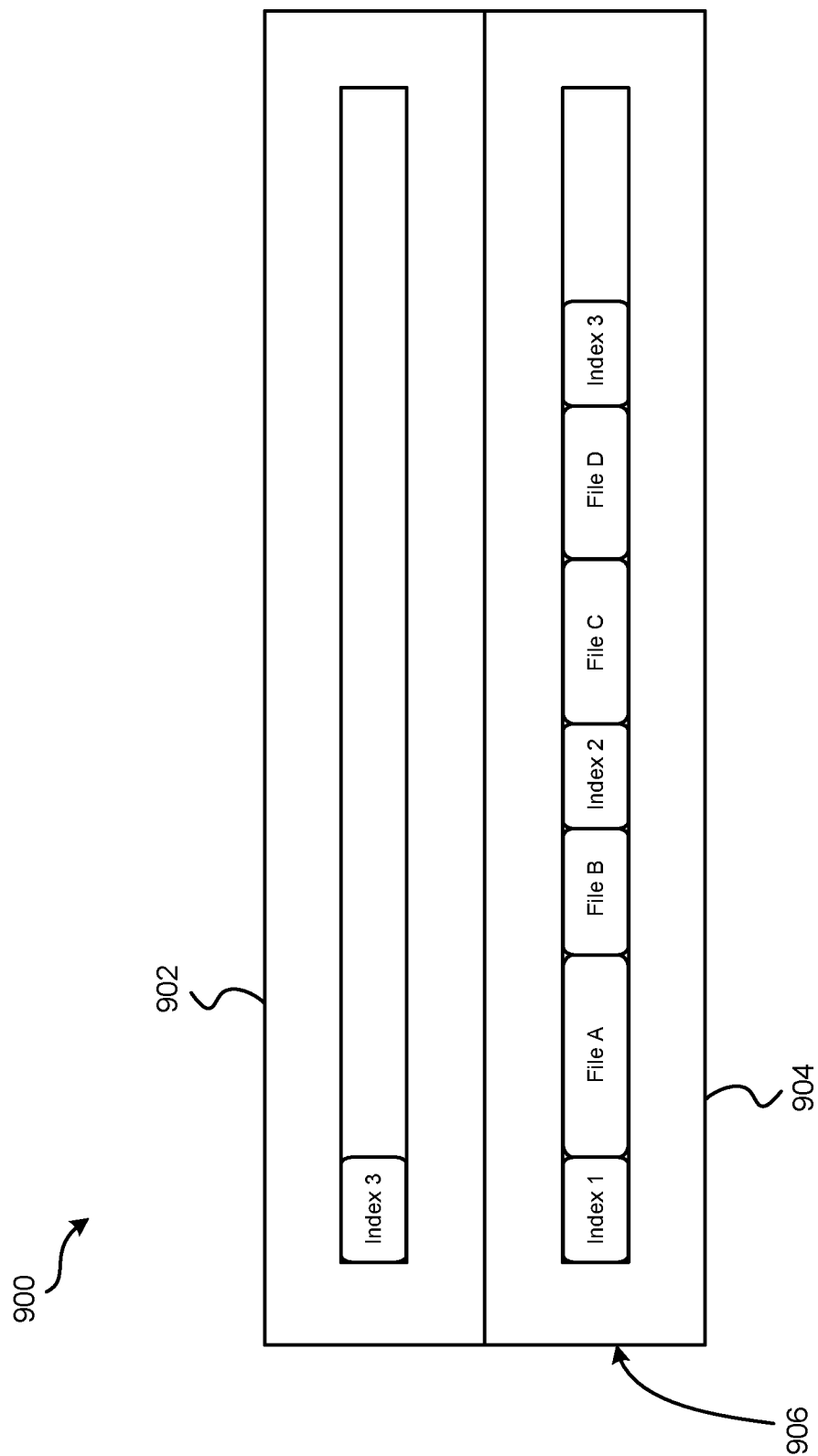
FIG. 9 is a representational diagram of files and indexes stored on a magnetic tape according to one approach.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As will be appreciated by one skilled in the art, by way of example, TMR is a magnetoresistive effect that occurs with a magnetic tunnel junction. TMR sensors typically include two ferromagnetic layers separated by a thin insulating barrier layer. If the barrier layer is thin enough e.g., less than about 15 angstroms, electrons can tunnel from one ferromagnetic layer to the other ferromagnetic layer, passing through the insulating material and thereby creating a current. Variations in the current, caused by the influence of external magnetic fields from a magnetic medium on the free ferromagnetic layer of the TMR sensor, correspond to data stored on the magnetic medium.

It is well known that TMR and other CPP MR sensors are particularly susceptible to shorting during fabrication due to abrasive lapping particles that scratch or smear conductive material across the insulating materials separating the conductive leads, e.g., opposing shields, which allow sense (bias) current to flow through the sensor and magnetic head as a whole. Friction between asperities on the tape and the ductile metallic films in the sensor gives rise to deformation forces in the direction of tape motion. As a result, an electrical short is created by the scratching and/or smearing across the layers which has a net effect of creating bridges of conductive material across the sensor. Particularly, the lapping particles tend to plow through ductile magnetic material, e.g., from one or both shields, smearing the metal across the insulating material, and thereby creating an electrical short that reduces the effective resistance of the sensor and diminishes the sensitivity of the sensor as a whole.

Scientists and engineers familiar with tape recording technology would not expect a CPP MR sensor to remain operable (e.g., by not experiencing shorting) in a contact recording environment such as tape data storage, because of the near certain probability that abrasive asperities embedded in the recording medium will scrape across the thin insulating layer during tape travel, thereby creating the aforementioned shorting.

Typical CPP MR sensors such as TMR sensors in hard disk drive applications are configured to be in electrical contact with the top and bottom shields of read head structures. In such configurations the current flow is constrained to traveling between the top shield and the bottom shield through the sensor, by an insulator layer with a thickness of about 3 to about 100 nanometers (nm). This insulator layer extends below the hard bias magnet layer to insulate the bottom of the hard bias magnet from the bottom shield/lead layers, and isolates the edges of the sensor from the hard bias magnet material. In a tape environment, where the sensor is in contact with the tape media, smearing of the top or bottom shield material can bridge the insulation layer separating the hard bias magnet from the bottom lead and lower shield, thereby shorting the sensor. Further, shield deformation or smearing can create a conductive bridge across a tunnel barrier layer in a TMR sensor. Such tunnel barrier layer may be only 12 angstroms wide or less.

In disk drives, conventional CPP MR designs are acceptable because there is minimal contact between the head and the media. However, for tape recording, the head and the media are in constant contact. Head coating has been cited as a possible solution to these shorting issues; however, tape particles and asperities have been known to scratch through and/or wear away these coating materials as well. Furthermore, conventional magnetic recording head coatings are not available for protecting against defects during lapping processes, as the coating is applied after these process steps. Because the insulating layers of a conventional CPP MR reader sensor are very thin, the propensity for electrical shorting due, e.g., to scratches, material deposits, surface defects, films deformation, etc., is high. Approaches described herein implement novel dielectric layers in combination with TMR read transducer sensors. As a result, some of the approaches described herein may be able to reduce the probability of, or even prevent, shorting in the most common areas where shorting has been observed, e.g. the relatively larger areas on opposite sides of the sensor between the shields.

The potential use of CPP MR reader sensors in tape heads has heretofore been thought to be highly undesirable, as tape heads include multiple sensors, e.g., 16, 32, 64, etc., on a single die. Thus, if one or more of those sensors become inoperable due to the aforementioned shorting, the entire head becomes defective and typically would need to be discarded and/or replaced for proper operation of the apparatus.

Conventional current in-plane type sensors require at least two shorting events across different parts of the sensor in order to affect the sensor output, and therefore such heads are far less susceptible to shorting due to scratches. In contrast, tape heads with CPP MR reader sensors may short with a single event, which is another reason that CPP MR reader sensors have not been adopted into contact recording systems.

Various approaches described herein comprise a module having scratch resilient TMR transducer structures. The resilience is provided in part by recessing the sensor from the media facing surface, and employing a flux guide to transfer flux to the sensor. The approaches herein are applicable to data read transducers as well as servo read transducers.

Figure 10:
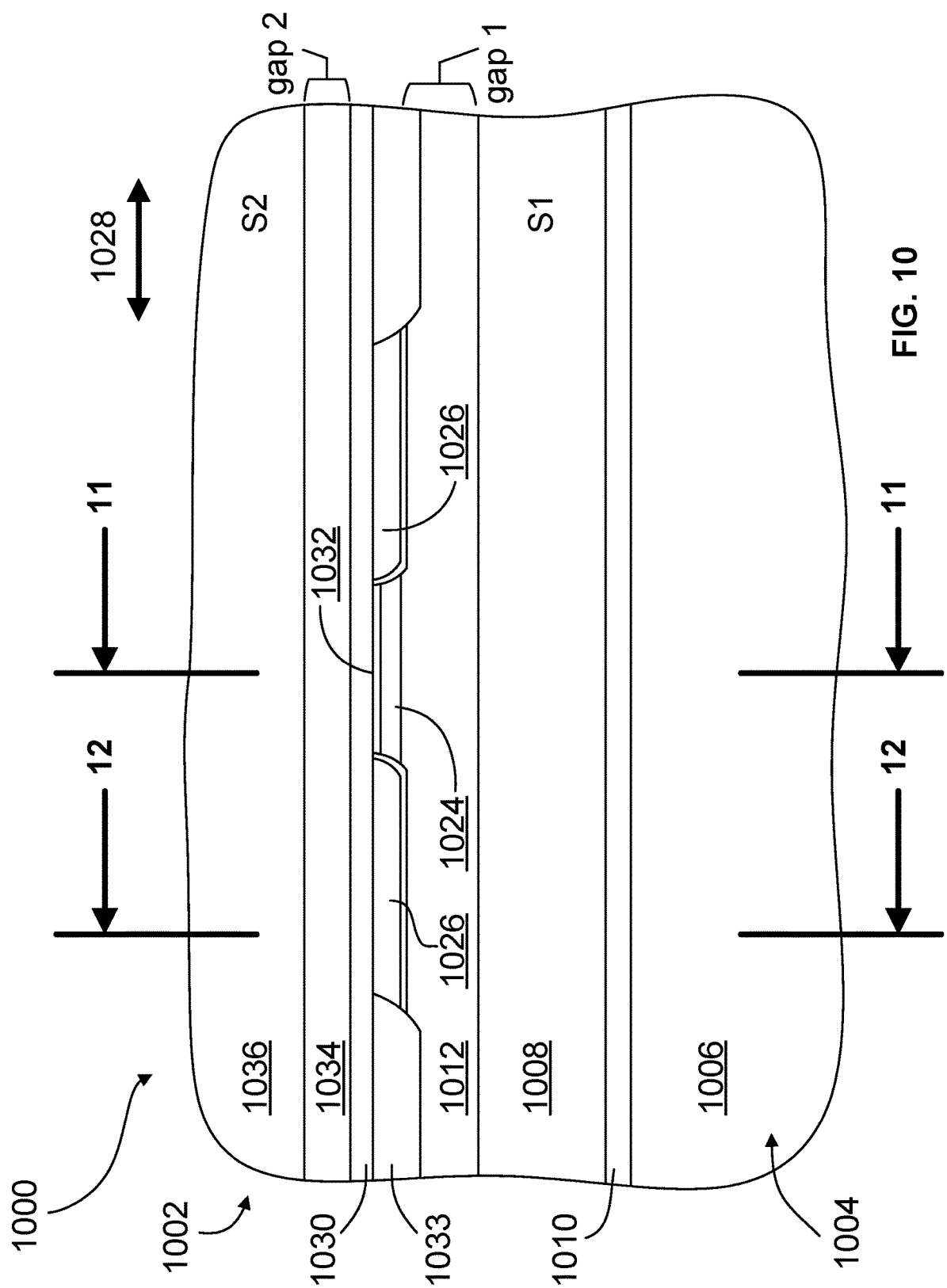
FIG. 10 is a partial media facing surface view of a portion of an apparatus, in accordance with one approach.
Figure 11:
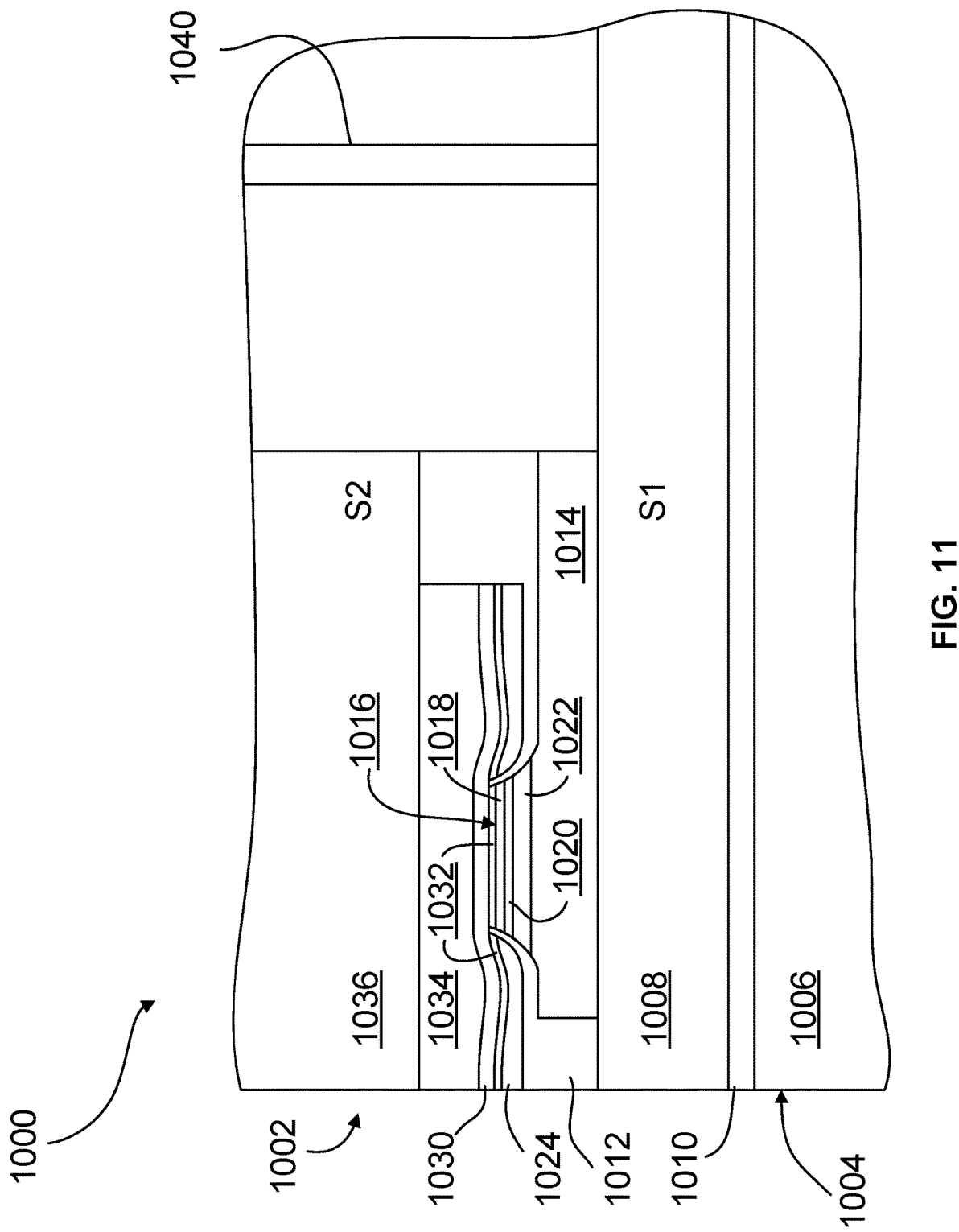
FIG. 11 is a partial cross-sectional view of the apparatus taken along line 11-11 of FIG. 10.
Figure 12:
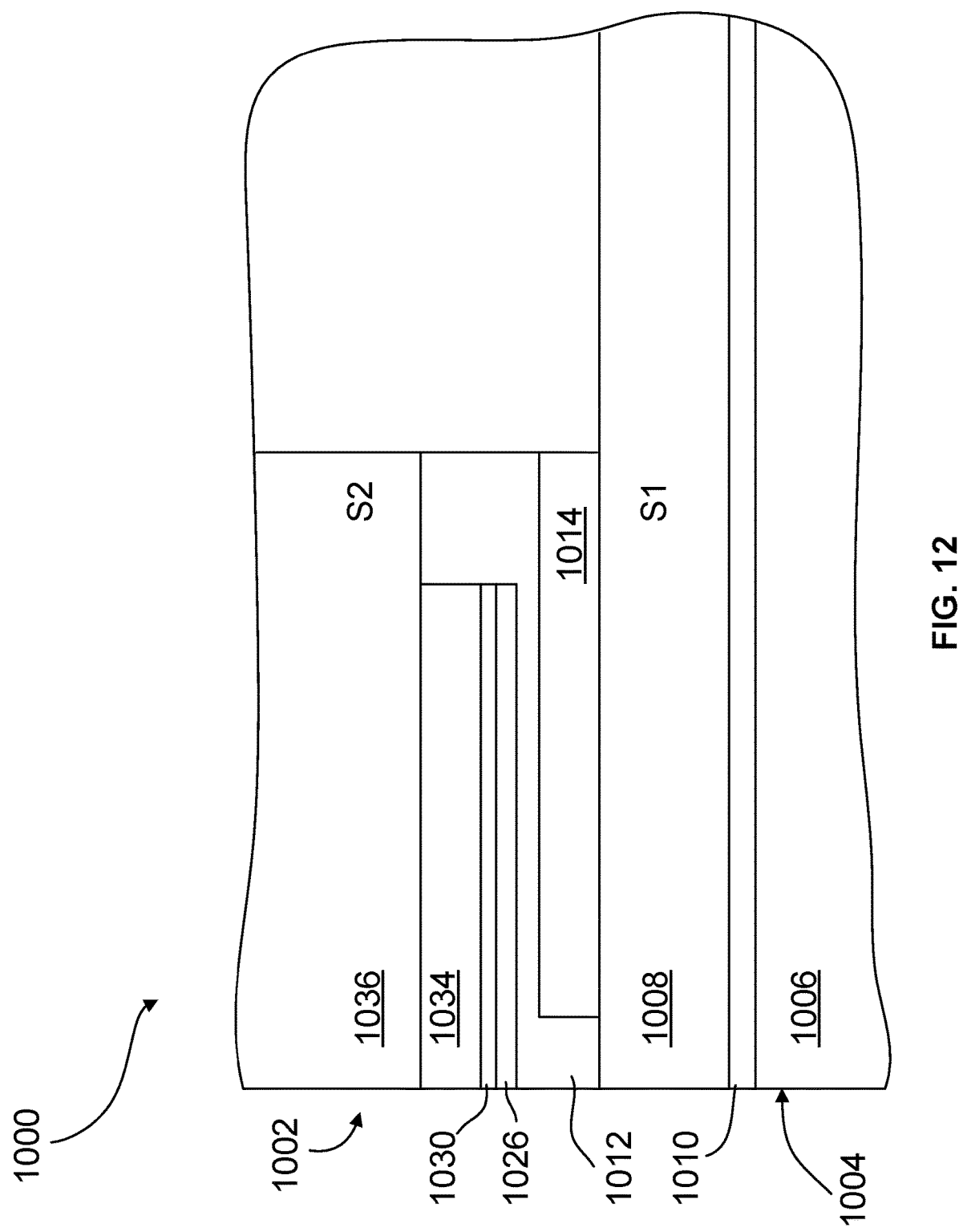
FIG. 12 is a partial cross-sectional view of the apparatus taken along line 12-12 of FIG. 10.

FIG. 10 depicts a media facing surface view of a portion of an apparatus 1000, in accordance with one approach. FIG. 11 is a partial cross-sectional view of the apparatus 1000 taken along line 11-11 of FIG. 10. FIG. 12 is a partial cross-sectional view of the apparatus 1000 taken along line 12-12 of FIG. 10. The apparatus 1000 may be any conceivable apparatus having the depicted structure or its equivalent. Accordingly, the apparatus 1000 may be as simple as a single module; as complex as a full storage system having, e.g., a tape library system; or anything in between, according to various aspects of the present invention.

As an option, the present apparatus 1000 may be implemented in conjunction with features from any other approach listed herein, such as those described with reference to the other FIGS. However, such apparatus 1000 and others presented herein may be used in various applications and/or in permutations which may or may not be specifically described in the illustrative approaches listed herein. Further, the apparatus 1000 presented herein may be used in any desired environment. Thus FIG. 10 (and the other FIGS.) may be deemed to include any possible permutation.

The apparatus includes a module 1002 in which various thin films reside. The module 1002 may have any desired configuration, such as any of those depicted in the other FIGS. described herein. The module 1002 may include one, two, or more of the thin film structures depicted, e.g., as a servo reader, as a data reader or in an array of data readers, etc. A media facing surface 1004 of the module is also present.

The module 1002 includes a suitable substrate 1006 of conventional construction, such as a composite of aluminum-titanium carbide (AlTiC). A first shield (S1) 1008 of soft magnetic material, such as a NiFe alloy, is deposited on a conventional undercoat 1010, typically alumina, on the substrate 1006. A first gap layer (gap 1) is made of two portions and is formed above the first shield 1008. A first portion of gap 1 is nonconducting insulating portion 1012 with an edge at the media facing surface 1004. Insulating portion 1012 may be formed of alumina or other conventional insulating material. A second portion of gap 1 is nonmagnetic electrically-conducting portion 1014 and is located below the sensor 1016.

The sensor 1016 is recessed from the media facing surface 1004. Any type of thin film magnetic sensor having a free layer may be implemented. The sensor 1016 is preferably a CPP sensor such as a TMR sensor, a giant magnetoresistive (GMR) sensor, etc. of conventional construction. A TMR sensor typically includes a ferromagnetic free layer 1018, insulating tunnel barrier layer 1020, which is typically MgO, and reference ferromagnetic layer 1022.

A flux guide 1024 extends from the media facing surface 1004 toward the sensor 1016. The purpose of the flux guide 1024 is to transfer flux from a magnetic recording medium, such as tape positioned adjacent the media facing surface 1004, to the free layer 1018 of the sensor 1016. By recessing the sensor 1016 and using the flux guide 1024 to transfer the flux to the sensor 1016, damage to the sensor 1016 due to asperities on the medium contacting the media facing surface 1004 is eliminated. Moreover, the conventional protective overcoat on the media facing surface 1004 can be eliminated, thereby reducing spacing loss between the media facing surface 1004 and the medium.

The flux guide 1024 may include a portion positioned behind the sensor 1016 relative to the media facing surface 1004. See FIG. 11. While this portion is optional, its presence has been found to increase amplitude by increasing the flux to the free layer 1018.

The flux guide 1024 is insulated from the sensor 1016 by the nonconducting insulating portion 1012 of gap 1. The flux guide 1024 is preferably formed of a soft magnetic material having low magnetostriction. Any conventional flux guide material may be used, with NiFe alloys such as 80/20 NiFe being preferred. The thickness of the flux guide 1024 is preferably at least that which would render the apparatus 1000 functional, as would be understood by one skilled in the art. In a preferred approach, the flux guide 1024 has a higher product of saturation moment times thickness than the product of saturation moment times thickness of the free layer 1018 of the sensor 1016.

It is desirable to stabilize not only the free layer 1018 which is recessed inside the structure, but also the flux guide 1024. However, one obstacle encountered by the inventors was how to stabilize the free layer 1018 and flux guide 1024 without shunting flux from the flux guide 1024. Such shunting reduces the signal output of the sensor 1016. Moreover, because the shield to shield spacing (read gap) for magnetic tape readback is large to enable detection of magnetic transitions on tape, a stabilization structure within the gap ideally would not act as a shield, which would effectively reduce the read gap.

To overcome the aforementioned challenges, a soft bias layer 1026 is positioned on opposite sides of the sensor 1016 in a cross-track direction 1028. Use of a soft bias layer 1026 instead of the typical hard bias layer provides at least three advantages. First, a soft biasing scheme provides a more uniform bias level across a population of heads. Second, the soft biasing layer provides side shielding of adjacent tracks. Third, the available bias field is larger from higher remanence.

Adoption of soft bias schemes designed for hard disk drives (HDD) will not function in a tape head because the stabilization structure would shunt most transition flux away from the free layer 1018 leaving insufficient signal. However, the soft bias scheme disclosed herein achieves all the desired advantages of soft bias while retaining the high signal of conventional hard bias.

In various approaches, the soft bias layer 1026 includes a soft magnetic material, for example, NiFe. The soft bias layer 1026 may be 80/20 NiFe (80% Ni and 20% Fe) but is not limited to NiFe. For example, in other approaches, soft bias layer 1026 is composed of NiFe, CoFe, or a combination of these materials (e.g., CoNiFe). A thickness of the soft bias layer 1026 ranges between five and fifteen nm but, is not limited to these thicknesses.

The soft bias layer 1026 may act as side shields for the sensor.

In a preferred approach, a product of a saturation moment times deposition thickness of the soft bias layer 1026 is higher than: a) a saturation moment times deposition thickness of a free layer 1018 of the sensor 1016, and is higher than b) a saturation moment times deposition thickness of the flux guide 1024.

A stabilization layer 1030 is formed above the sensor 1016, flux guide 1024 and soft bias layer 1026 for stabilizing the soft bias layer 1026. The stabilization layer 1030 is or includes a magnetic layer that pins the magnetic orientation of the soft bias layer 1026, and in turn, the soft bias layer 1026 gently stabilizes the magnetic orientations of the free layer 1018 and flux guide 1024 while allowing the magnetics in the free layer 1018 and flux guide 1024 to function as needed for detecting magnetic transitions on media.

The stabilization layer 1030 should have a high reluctance so that it does not divert flux from the flux guide 1024. The stabilization layer 1030 preferably has a reluctance that is higher than a reluctance of a free layer 1018 of the sensor 1016. More preferably, the reluctance of the stabilization layer 1030 is above a level at which the stabilization layer 1030 shunts no more than negligible flux away from the flux guide 1024. Said another way, the reluctance of the stabilization layer 1030 is high enough to prevent the stabilization layer 1030 from shunting flux away from the flux guide 1024 and sensor 1016.

The stabilization layer 1030 may include an antiferromagnetic material for pinning a magnetic orientation of the soft bias layer 1026 via exchange coupling. In such approaches, the antiferromagnetic material has negligible effect on the magnetic flux passing along the flux guide 1024 to the free layer 1018. Any conventional antiferromagnetic material may be used, with IrMn being preferred. An illustrative thickness of the stabilization layer 1030 is at least 6 nm thick to provide adequate stability, and preferably in a range of 6 to 12 nm, but could be higher or lower.

Various configurations of the stabilization layer 1030 are described with reference to the representative media facing surface views of FIGS. 14-17, discussed immediately below. Any of the approaches discussed therein may be used in apparatus 1000.

Figure 14:
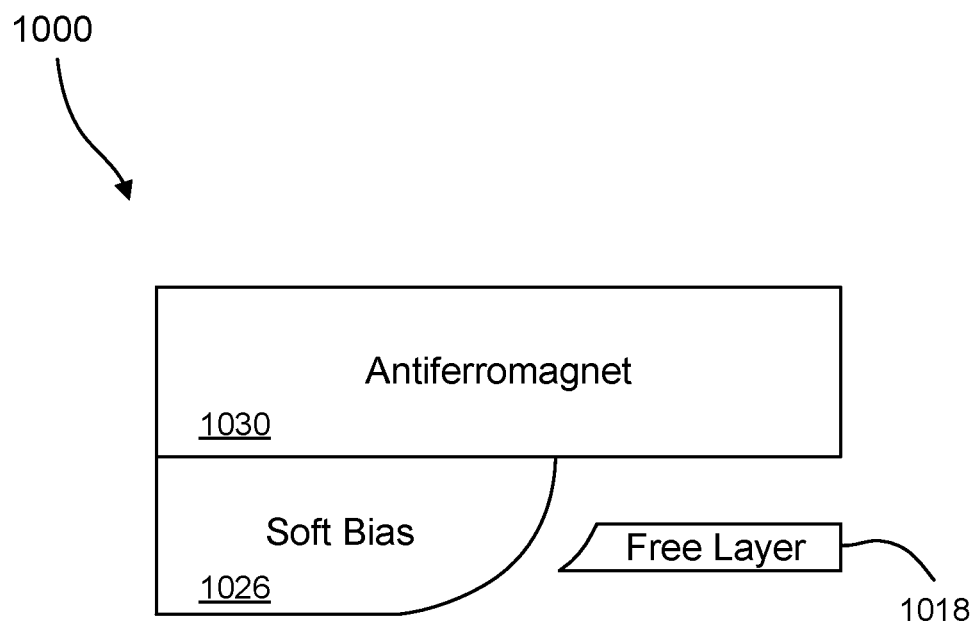
FIG. 14 is a representational media facing surface view of the apparatus with a stabilization layer formed directly on the soft bias layer.

FIG. 14 depicts an approach with a stabilization layer 1030 formed directly on the soft bias layer 1026. Also depicted is the free layer 1018 of the sensor 1016.

Figure 15:
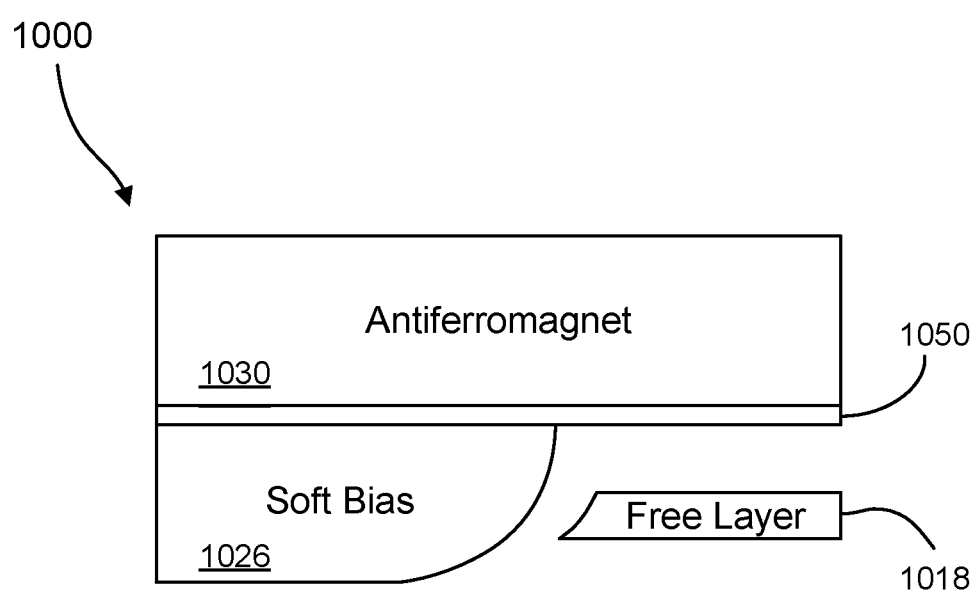
FIG. 15 is a representational media facing surface view of the apparatus in which a stitching layer is positioned between the stabilization layer and the soft bias layer.

FIG. 15 depicts an approach in which a stitching layer 1050 is positioned between the stabilization layer 1030 and the soft bias layer 1026. A material that stitches better to the stabilization layer 1030 may be used to enhance the bias applied to the soft bias layer 1026. Exemplary materials for the stitching layer 1050 include Co and Co alloys. For example, CoFe stitches better to an antiferromagnet than NiFe, and thus the resulting pinning of the soft bias layer 1026 is enhanced. Note that though CoFe may be present, it will be pinned so strongly by the stabilization layer 1030 that it will not notably divert flux from the flux guide 1024.

Figure 16:
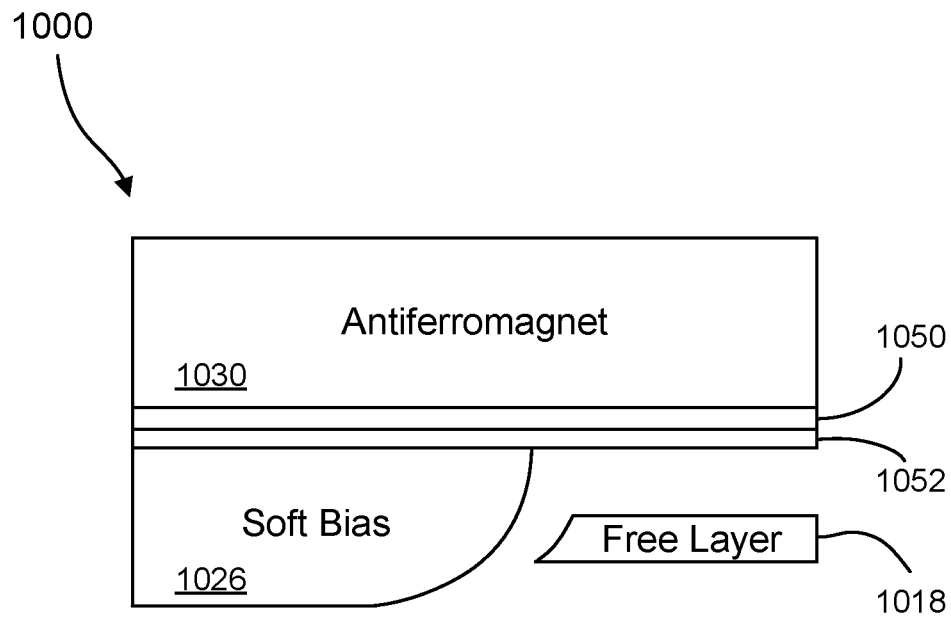
FIG. 16 is a representational media facing surface view of the apparatus in which a stitching layer is positioned between the stabilization layer and the soft bias layer, and a soft bias overlayer is positioned between the stitching layer and the soft bias layer.

FIG. 16 depicts an approach in which a stitching layer 1050 is positioned between the stabilization layer 1030 and the soft bias layer 1026, and a soft bias overlayer 1052 is positioned between the stitching layer 1050 and the soft bias layer 1026. The soft bias overlayer 1052 may be constructed of a soft magnetic material, such as NiFe.

Figure 17:
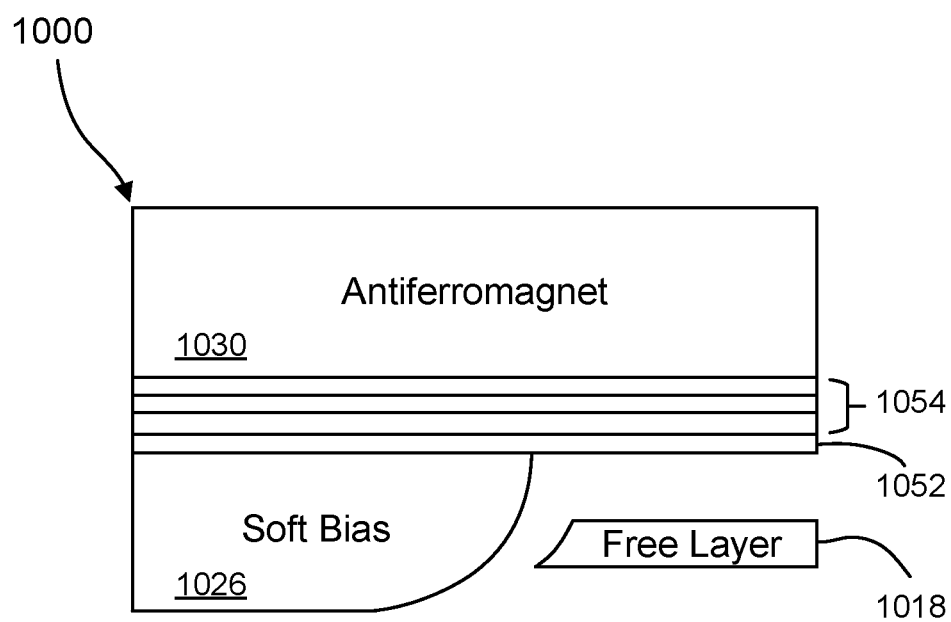
FIG. 17 is a representational media facing surface view of the apparatus in which a synthetic pinned layer structure of conventional type is positioned between the stabilization layer and the soft bias layer.

FIG. 17 depicts an approach in which a synthetic pinned layer structure 1054 of conventional type is positioned between the stabilization layer 1030 and the soft bias layer 1026. The resulting structure is sometimes referred to in the art as a synthetic antiferromagnet. This structure is very robust and resistant to magnetic orientation changes due to events such as physical impacts. An illustrative synthetic pinned layer structure 1054 includes a layer of Co or CoFe, a layer of Ru thereabove, and a second layer of Co or CoFe above the Ru layer. An optional soft bias overlayer 1052 between the synthetic pinned layer structure and the soft bias layer 1026 is also shown.

In FIGS. 14-17, the thicknesses of the various layers can be readily determined by modeling by one skilled in the art once apprised of the teachings herein.

A nonmagnetic exchange break layer 1032 is formed above the sensor 1016 and the flux guide 1024 for magnetically decoupling the sensor 1016 and the flux guide 1024 from the stabilization layer 1030. In some approaches, the exchange break layer includes two separately-formed sub-layers, a first of the sub-layers being positioned only above the sensor 1016 and a second of the sub-layers being positioned only above the flux guide 1024. Such configuration may provide a processing advantage, in that each sub-layer of the exchange break layer can be formed while defining the respective underlying structure.

The exchange break layer is preferably electrically conductive, and also preferably nonmagnetic. Illustrative materials for the exchange break layer include Ta, Ir, etc. The exchange break layer has a thickness effective to essentially magnetically decouple the stabilization layer 1030 from the flux guide 1024 and free layer 1018. In general, the exchange break layer should be at least 1 nm thick, and in one exemplary approach is about 3 nm thick.

Note that the exchange break layer 1032 is not located between the soft bias layer 1026 and the stabilization layer 1030, thereby allowing the stabilization layer 1030 to stabilize the soft bias layer 1026.

An electrically insulative isolation layer 1033 may be formed adjacent the soft bias layer 1026. A second gap layer 1034 (gap 2) of non-magnetic but electrically-conducting material is formed above the exchange break layer 1032, and a second shield (S2) 1036 of soft magnetic material is deposited above gap 2. The conductive portions of gap 1 and gap 2 may be formed of a metal or metal alloy, preferably iridium (Ir), ruthenium (Ru), a nickel-chromium (NiCr) alloy, etc. Gap 1 and gap 2 each preferably has a thickness to achieve an optimal shield-to-shield spacing. An illustrative shield-to-shield spacing is 80 nm to 120 nm, but could be higher or lower than this range. As mentioned above, the magnetic transitions on tape are typically located much farther away from the media facing surface 1004 than they would be in a disk drive. Accordingly, a wider shield-to-shield spacing is desired to allow enough flux to reach the free layer 1018 so as to be detectable.

Figure 13:
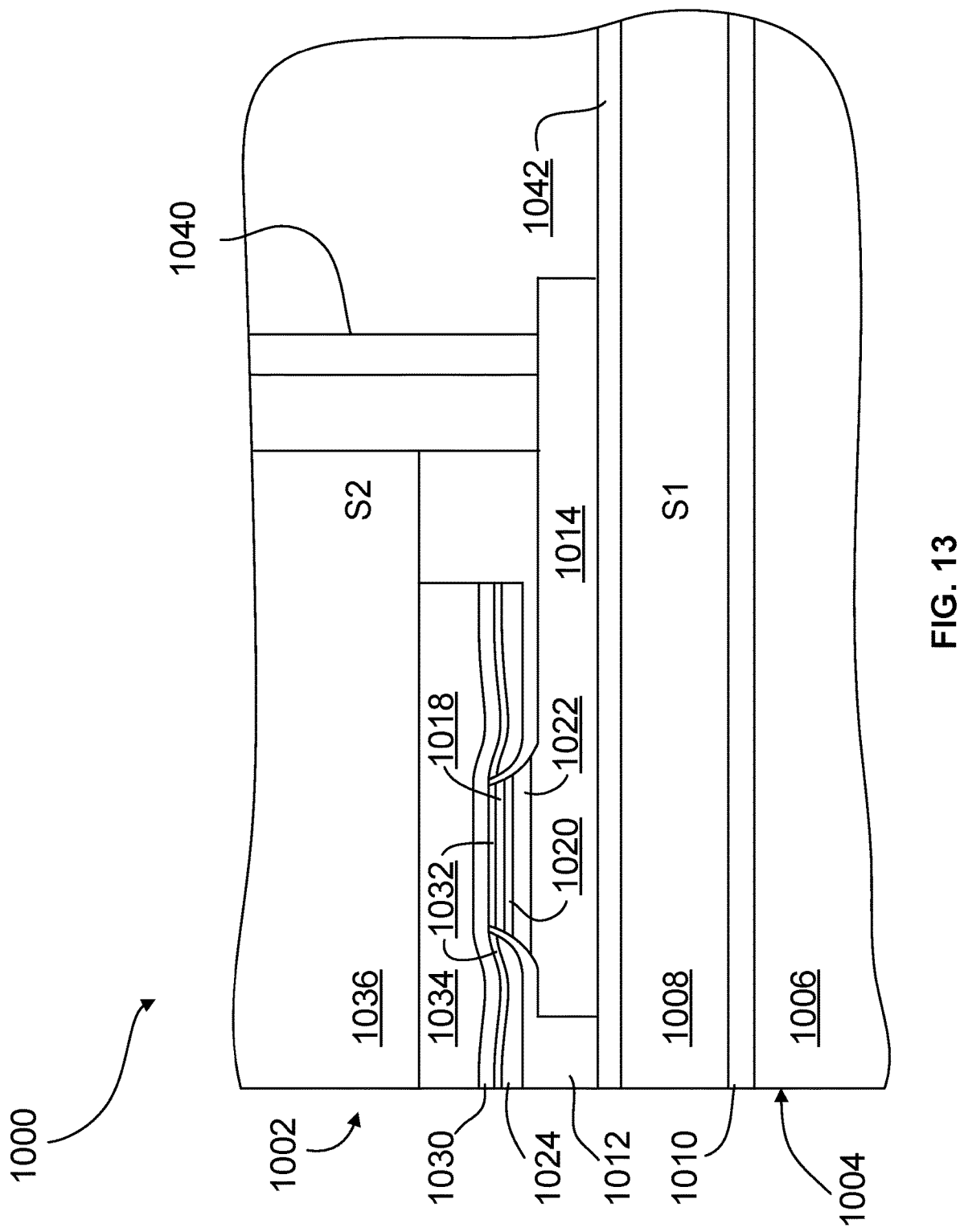
FIG. 13 is a partial cross-sectional view of the apparatus in which the first shield of the apparatus is isolated from gap 1 by an insulating layer.

The conductive portions of gap 1 and gap 2 may be placed in electrical communication with electrical pads on the module 1002 in any conceivable manner. In one approach, depicted in FIG. 11, the shields are coupled to pads (not shown) via conventional conductive vias 1040. FIG. 13 depicts another approach in which the first shield 1008 of the apparatus 1000 is isolated from gap 1 by an insulating layer 1042.

An optional protective overcoat, such as a <20 μm film of alumina, may be formed on the media facing surface 1004. However, an overcoat is undesirable because it increases the spacing between the edge of the flux guide 1024 and the magnetic tape. The approach shown in FIG. 13 provides the additional advantage that eliminates all need for an overcoat on the media facing surface 1004. This is because both shields may be maintained at the same electrical potential. Thus, even if a scratch at the media facing surface 1004 were to cause NiFe material from one of the shields to bridge the insulating portion 1012 of gap 1, there would be no shorting of the sense current.

Again, the apparatus 1000 may be implemented in conjunction with features from any other approach listed herein, such as those described with reference to the other FIGS. For example, the apparatus 1000 may include a drive mechanism for passing a magnetic medium over the module 1002, and a controller electrically coupled to the sensor 1016.

The various layers of the apparatus 1000 may be formed by conventional thin film fabrication techniques, in any suitable sequence, as would become apparent to one skilled in the art upon reading the present disclosure.

A method for forming the apparatus 1000, in accordance with one approach, includes forming a sensor 1016 at a position recessed from an expected location of a media facing surface 1004. A flux guide 1024 extending toward the sensor 1016 from the expected location of the media facing surface 1004 is also formed. A nonmagnetic exchange break layer is formed above the sensor 1016 and the flux guide 1024. Forming the exchange break layer may include forming two separately-formed sub-layers such that a first of the sub-layers is positioned only above the sensor 1016 and a second of the sub-layers is positioned only above the flux guide 1024. A soft bias layer 1026 is formed on opposite sides of the sensor 1016 in a cross-track direction. A stabilization layer 1030 is formed above the exchange break layer and soft bias layer 1026 for stabilizing the soft bias layer 1026, the exchange break layer magnetically decoupling the sensor 1016 and the flux guide 1024 from the stabilization layer 1030.

Other layers may also be formed. For example, a nonmagnetic upper spacer layer may be formed above the stabilization layer 1030 for defining a gap distance between the sensor 1016 and an upper shield.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described approaches. The terminology used herein was chosen to best explain the principles of the aspects, the practical application or technical improvement over technologies found in the marketplace, or to enable others of ordinary skill in the art to understand the aspects disclosed herein.

What is claimed is:

1. An apparatus, comprising:
   a module having a media facing surface, the module comprising:
   a sensor recessed from the media facing surface;
   a flux guide extending from the media facing surface toward the sensor;
   a soft bias layer positioned on opposite sides of the sensor in a cross-track direction;
   a stabilization layer above the sensor, flux guide and soft bias layer for stabilizing the soft bias layer; and
   a nonmagnetic exchange break layer above the sensor and the flux guide for magnetically decoupling the sensor and the flux guide from the stabilization layer.

2. The apparatus as recited in claim 1, comprising a first shield below the sensor, an insulating portion extending between the first shield and the flux guide along the media facing surface, a nonmagnetic first gap layer positioned behind the insulating portion relative to the media facing surface, a nonmagnetic second gap layer positioned above the stabilization layer, and a second shield above the second gap layer.

3. The apparatus as recited in claim 2, wherein at least portions of the gap layers are electrically conductive.

4. The apparatus as recited in claim 1, wherein a portion of the flux guide is positioned behind the sensor relative to the media facing surface.

5. The apparatus as recited in claim 1, wherein the exchange break layer includes two separately-formed sub-layers, a first of the sub-layers being positioned only above the sensor and a second of the sub-layers being positioned only above the flux guide.

6. The apparatus as recited in claim 1, wherein the exchange break layer is electrically conductive.

7. The apparatus as recited in claim 1, wherein the stabilization layer has a reluctance that is higher than a reluctance of a free layer of the sensor.

8. The apparatus as recited in claim 1, wherein the stabilization layer includes an antiferromagnetic material for pinning a magnetic orientation of the soft bias layer.

9. The apparatus as recited in claim 1, wherein the stabilization layer is formed directly on the soft bias layer.

10. The apparatus as recited in claim 1, comprising a stitching layer between the stabilization layer and the soft bias layer.

11. The apparatus as recited in claim 10, comprising a soft bias overlayer between the stitching layer and the soft bias layer.

12. The apparatus as recited in claim 1, comprising a synthetic pinned layer structure between the stabilization layer and the soft bias layer.

13. The apparatus as recited in claim 12, comprising a soft bias overlayer between the synthetic pinned layer structure and the soft bias layer.

14. The apparatus as recited in claim 1, wherein a product of a saturation moment times deposition thickness of the soft bias layer is higher than: a) a saturation moment times deposition thickness of a free layer of the sensor, and is higher than b) a saturation moment times deposition thickness of the flux guide.

15. The apparatus as recited in claim 1, further comprising:
a drive mechanism for passing a magnetic medium over the module; and
a controller electrically coupled to the sensor.

16. An apparatus, comprising:
a module having a media facing surface, the module comprising:
a first shield;
a sensor above the first shield and recessed from the media facing surface;
a flux guide extending from the media facing surface toward the sensor;
a soft bias layer positioned on opposite sides of the sensor in a cross-track direction;
a stabilization layer above the sensor, flux guide and soft bias layer for stabilizing the soft bias layer;
a nonmagnetic exchange break layer above the sensor and the flux guide for magnetically decoupling the sensor and the flux guide from the stabilization layer;
a nonmagnetic gap layer positioned above the stabilization layer; and
a second shield above the gap layer.

17. The apparatus as recited in claim 16, wherein a portion of the flux guide is positioned behind the sensor relative to the media facing surface.

18. The apparatus as recited in claim 16, wherein the exchange break layer includes two separately-formed sub-layers, a first of the sub-layers being positioned only above the sensor and a second of the sub-layers being positioned only above the flux guide.

19. The apparatus as recited in claim 16, wherein the stabilization layer has a reluctance that is higher than a reluctance of a free layer of the sensor.

20. The apparatus as recited in claim 16, wherein the stabilization layer is formed directly on the soft bias layer.

21. The apparatus as recited in claim 16, comprising a stitching layer between the stabilization layer and the soft bias layer.

22. The apparatus as recited in claim 16, comprising a synthetic pinned layer structure between the stabilization layer and the soft bias layer.

23. A method for forming an apparatus, comprising:
forming a sensor at a position recessed from an expected location of a media facing surface;
forming a flux guide extending toward the sensor from the expected location of the media facing surface;
forming a nonmagnetic exchange break layer above the sensor and the flux guide;
forming a soft bias layer on opposite sides of the sensor in a cross-track direction; and
forming a stabilization layer above the exchange break layer and soft bias layer for stabilizing the soft bias layer, the exchange break layer magnetically decoupling the sensor and the flux guide from the stabilization layer.

24. The method as recited in claim 23, comprising forming a nonmagnetic gap layer above the stabilization layer for defining a gap distance between the sensor and a second shield formed above the sensor.

25. The method as recited in claim 23, wherein forming the exchange break layer includes forming two separately-formed sub-layers such that a first of the sub-layers is positioned only above the sensor and a second of the sub-layers is positioned only above the flux guide.

* * * * *